(12) United States Patent
Hiatt et al.

(10) Patent No.: US 9,744,943 B1
(45) Date of Patent: Aug. 29, 2017

(54) BRACELET WITH CLOCK AND REMOTE KEY FOB

(71) Applicants: Matthew Kenyon Hiatt, Wheaton, IL (US); Christopher Minuche, Roselle, IL (US); Brenden Alexander Pooley, Steger, IL (US)

(72) Inventors: Matthew Kenyon Hiatt, Wheaton, IL (US); Christopher Minuche, Roselle, IL (US); Brenden Alexander Pooley, Steger, IL (US)

( * ) Notice: Subject to any disclaimer, the term of this patent is extended or adjusted under 35 U.S.C. 154(b) by 0 days.

(21) Appl. No.: 14/867,214

(22) Filed: Sep. 28, 2015

Related U.S. Application Data (60) Provisional application No. 62/170,739, filed on Jun. 4, 2015.

(51) Int. Cl.
*B60R 25/04* (2013.01)
*F02N 11/08* (2006.01)
(Continued)

(52) U.S. Cl.
CPC ............ *B60R 25/209* (2013.01); *B60R 25/04* (2013.01); *F02N 11/0807* (2013.01); *G04G 9/00* (2013.01);
(Continued)

(58) Field of Classification Search
CPC ....... B60R 25/04; B60R 25/209; G08C 17/02; G08C 2201/93; F02N 11/08;
(Continued)

(56) References Cited

U.S. PATENT DOCUMENTS 6,282,152 B1 * 8/2001 Kurple .................. G04G 21/04
340/12.28
7,068,151 B2   6/2006 Giles
(Continued)

FOREIGN PATENT DOCUMENTS

| EP | 1205829 | | 5/2002 |
| JP | 61066863 A | * | 4/1986 |
| JP | 2001256036 A | * | 9/2001 |

OTHER PUBLICATIONS

JPO machine translation of JP 2001-256036 (original JP document published Sep. 21, 2001).*
(Continued)

*Primary Examiner* — Behrang Badii
*Assistant Examiner* — David Testardi
(74) *Attorney, Agent, or Firm* — Law Offices of Konrad Sherinian (57) ABSTRACT

A fashionable bracelet operates as a remote car key fob and a clock. The bracelet provides multiple buttons allowing a user to operate the bracelet to control access to the vehicle coupled to the bracelet. The bracelet receives voice commands to operate the vehicle. Moreover, the bracelet incorporates a GPS subsystem for auto-piloting the vehicle to the location of the user. The bracelet further incorporates multiple LEDs to provide operational feedback to the user. The clock can be turned on and off using one of the buttons. The wireless key fob functions and the clock are controlled by a microcontroller disposed within the bracelet. The bracelet includes a battery to provide power to various components of the bracelet. The battery is operatively coupled to a solar panel. The bracelet is conveniently and securely attached to the wrist of the user.

10 Claims, 9 Drawing Sheets

(51) Int. Cl.
*B60R 25/20* (2013.01)
*G05D 1/02* (2006.01)
*G07C 9/00* (2006.01)
*G10L 15/08* (2006.01)
*G05D 1/00* (2006.01)
*G04G 9/00* (2006.01)

(52) U.S. Cl.
CPC ......... *G05D 1/0016* (2013.01); *G05D 1/0278* (2013.01); *G07C 9/00182* (2013.01); *G10L 15/08* (2013.01); *G08C 2201/93* (2013.01)

(58) Field of Classification Search
CPC ...... F02N 11/0807; G07C 2009/00222; G07C 2009/00261; B60H 1/00657
See application file for complete search history.

(56) References Cited

U.S. PATENT DOCUMENTS

| | | | | |
|---|---|---|---|---|
| 7,102,507 | B1* | 9/2006 | Lauren | G07C 9/00182 340/12.55 |
| 7,301,442 | B2 | 11/2007 | Kolpasky | |
| D600,571 | S | 9/2009 | Singer | |
| 9,007,195 | B2 | 4/2015 | Ghabra | |
| 2004/0227642 | A1* | 11/2004 | Giles | B60R 25/00 340/12.23 |
| 2006/0211368 | A1* | 9/2006 | Wisnia | B60R 25/04 455/3.06 |
| 2009/0146947 | A1 | 6/2009 | Ng | |
| 2009/0197533 | A1 | 8/2009 | Luk | |
| 2010/0128570 | A1* | 5/2010 | Smith | G07C 9/00944 368/10 |
| 2011/0102164 | A1* | 5/2011 | Ghabra | B60R 25/04 340/426.13 |
| 2013/0079952 | A1* | 3/2013 | Fazi | F02D 45/00 701/2 |
| 2013/0231824 | A1* | 9/2013 | Wilson | G05D 1/0088 701/26 |
| 2014/0360399 | A1* | 12/2014 | Rees | A63H 19/24 104/295 |
| 2015/0015368 | A1* | 1/2015 | Roth | B60R 25/24 340/5.65 |
| 2015/0073645 | A1* | 3/2015 | Davidsson | B62D 15/0285 701/23 |
| 2015/0081169 | A1 | 3/2015 | Pisz | |
| 2015/0332532 | A1* | 11/2015 | Lee | G07C 9/00563 340/5.72 |
| 2016/0116293 | A1* | 4/2016 | Grover | G01C 21/34 701/23 |

OTHER PUBLICATIONS

Wikipedia article, "KITT", old revision dated May 25, 2015 (describing the fictional Knight Industries Two Thousand automobile), 17 pages.*
Manual of 4-Button Key Ring Remote 2GIG-KEY1-345, 2gig Technologies Inc., www.2gig.com, 2009.
Designing Next-Generation Key Fobs, Paul Lepek, Automotive Compilation vol. 7, www.atmel.com, 2010.

* cited by examiner

BRACELET WITH CLOCK AND REMOTE KEY FOB

CROSS REFERENCE TO RELATED APPLICATIONS

This application claims the benefit and priority of U.S. Patent Application No. 62/170,739, entitled "BRACELET WITH CLOCK AND REMOTE KEY FOB," filed Jun. 4, 2015 and which is hereby incorporated by reference in its entirety.

FIELD OF THE DISCLOSURE

The present invention generally relates to remote key fobs for controlling access to vehicles, and more particularly relates to remote vehicle key fobs in the form of a bracelet. More particularly still, the present disclosure relates to bracelets including clocks and remote key fobs for controlling entry to and operating vehicles with autopilot features.

DESCRIPTION OF BACKGROUND

Remote key fobs (also known as wireless key fobs) allow their users to control access to the users' vehicles. Wireless key fobs for vehicles are widely available for new vehicles. A remote key fob usually includes a number of buttons, such as a door lock button, a door unlock button, a trunk button and a panic button. As a remote keyless entry device, the remote key fob includes a wireless transceiver for communicating with a corresponding vehicle to, for example, unlock a door, lock the door, open the trunk or close the trunk of the vehicle in response to operation by the user on the buttons of the key fob. The communication link between the wireless key fob and the vehicle is, for example, a radio frequency ("RF") link. The RF link falls into a particular frequency band, such as 125 kHz or 13.56 MHz.

The remote key fob is preprogrammed with a key fob device ID (meaning identifier) and implements authentication protocols. The authentication protocol includes an encryption stage for authorizing the issue of the key fob commands to the vehicle. Accordingly, the wireless key fob is identified by the vehicle and vice versa before any operation on the vehicle is performed using the remote key fob. The remote key fob can also communicate with an engine controller of the vehicle using, for example, a Near Field Communication ("NFC") transponder.

Remote car key fobs have been made compact and are powered by coin batteries. For example, some wireless key fobs are less than two inches in length, about one inch in width and less than one third inch in thickness. A compact wireless remote key fob is usually attached to a key chain along with other keys of the user of the key fob. The collection of keys and other apparatuses attached to the key chain (collectively referred to herein as key chain) is usually heavy and takes more space. The key chain is thus inconvenient to carry around on the body of the user.

In addition, the key chain can be easily lost by the user, stolen or locked inside his/her vehicle. Such events are burdensome to the user's life. In addition, the key chain and the remote key fob fail to provide other useful functions to the user, such as current time and date, reminder of open trunk, reminder of auto-start over certain amount of time, etc. Furthermore, the key chain does not provide an aesthetical element to the user.

Accordingly, there is a need for a new apparatus that provides the functionality of a remote key fob, is convenient to carry around and prevents loss and theft. There is a further need for the new device to provide a time function, a temperature, notifications and aesthetical effect.

OBJECTS OF THE DISCLOSED SYSTEM, METHOD, AND APPARATUS

Accordingly, it is an object of this disclosure to provide a bracelet supporting the functionality of a remote key fob for a vehicle.

Another object of this disclosure is to provide a bracelet key fob that is waterproof.

Another object of this disclosure is to provide a bracelet key fob that is water resistant.

Another object of this disclosure is to provide a bracelet key fob for controlling access to a vehicle within certain distance from the vehicle.

Another object of this disclosure is to provide a bracelet key fob with an auto-start button.

Another object of this disclosure is to provide a bracelet key fob with an auto-start button and an LED associated with the auto-start button.

Another object of this disclosure is to provide a bracelet key fob that notifies the user after the vehicle has auto-started over a predetermined amount of time.

Another object of this disclosure is to provide a bracelet key fob that notifies the user after the vehicle has auto-started over a predetermined amount of time using vibration or LEDs.

Another object of this disclosure is to provide a bracelet key fob with a lock button.

Another object of this disclosure is to provide a bracelet key fob with a lock button and an LED associated with the lock button.

Another object of this disclosure is to provide a bracelet key fob with an unlock button.

Another object of this disclosure is to provide a bracelet key fob with an unlock button and an LED associated with the unlock button.

Another object of this disclosure is to provide a bracelet key fob that notifies the user after the vehicle has been left un-locked after the user is away from the vehicle over a certain radius.

Another object of this disclosure is to provide a bracelet key fob with a panic button.

Another object of this disclosure is to provide a bracelet key fob with a panic button and an LED associated with the panic button.

Another object of this disclosure is to provide a bracelet key fob that vibrates after a panic button has been pressed.

Another object of this disclosure is to provide a bracelet key fob with a trunk button.

Another object of this disclosure is to provide a bracelet key fob with a trunk button and an LED associated with the trunk button.

Another object of this disclosure is to provide a bracelet key fob that vibrates when a trunk button has been pressed and the trunk has been open for a certain amount of time.

Another object of this disclosure is to provide a bracelet key fob with a clock.

Another object of this disclosure is to provide a bracelet key fob with a digital clock.

Another object of this disclosure is to provide a bracelet key fob with a digital clock that can be turned off.

Another object of this disclosure is to provide a bracelet key fob with a digital clock and a time button to light up the clock.

Another object of this disclosure is to provide a bracelet key fob with a digital clock and a time button to turn off and on the clock.

Another object of this disclosure is to provide a bracelet key fob with a logo imprinted.

Another object of this disclosure is to provide a bracelet key fob with a logo of a vehicle manufacturer imprinted.

Another object of this disclosure is to provide a bracelet key fob in color.

Another object of this disclosure is to provide a bracelet key fob with fashion elements.

Another object of this disclosure is to provide a bracelet key fob with a GPS subsystem.

Another object of this disclosure is to provide a bracelet key fob with a GPS subsystem for controlling a vehicle to autopilot to the location of the bracelet key fob.

Another object of this disclosure is to provide a voice input system.

Another object of this disclosure is to provide a voice input system that recognizes operation commands from voice input.

Another object of this disclosure is to provide a voice input system that takes voice input from car phone and system.

Another object of this disclosure is to provide an error system in the bracelet key fob that mini-vibrations will go off and the LED stays red.

Other advantages of this disclosure will be clear to a person of ordinary skill in the art. It should be understood, however, that a system or method could practice the disclosure while not achieving all of the enumerated advantages, and that the protected disclosure is defined by the claims.

SUMMARY OF THE DISCLOSURE

Generally speaking, pursuant to the various embodiments, the present disclosure provides a bracelet providing functions of a remote key fob and a clock. The bracelet key fob includes a microcontroller, a transceiver, a set of buttons, a set of LEDs associated with the set of buttons, a battery, a solar panel and a clock with a display and a back light. Furthermore, the bracelet incorporates a GPS subsystem providing the location of the user to the vehicle. The bracelet directs the vehicle to self-drive to the physical location of the user. Operating the buttons causes the microcontroller to sends commands to the vehicle coupled to the bracelet over the transceiver. The commands can be a lock command, an unlock command, a panic message, an open-truck command, etc. The clock is powered by a battery, or a rechargeable battery coupled to the solar panel. The bracelet further incorporates fashion elements. In addition, the operational commands of the bracelet can be entered through voice input. The voice input includes a name of the bracelet.

BRIEF DESCRIPTION OF THE DRAWINGS

Although the characteristic features of this disclosure will be particularly pointed out in the claims, the invention itself, and the manner in which it may be made and used, may be better understood by referring to the following description taken in connection with the accompanying drawings forming a part hereof, wherein like reference numerals refer to like parts throughout the several views and in which:

A person of ordinary skills in the art will appreciate that elements of the figures above are illustrated for simplicity and clarity, and are not necessarily drawn to scale. The dimensions of some elements in the figures may have been exaggerated relative to other elements to help understanding of the present teachings. Furthermore, a particular order in which certain elements, parts, components, modules, steps, actions, events and/or processes are described or illustrated may not be actually required. A person of ordinary skills in the art will appreciate that, for the purpose of simplicity and clarity of illustration, some commonly known and well-understood elements that are useful and/or necessary in a commercially feasible embodiment may not be depicted in order to provide a clear view of various embodiments in accordance with the present teachings.

DETAILED DESCRIPTION

Figure 1:
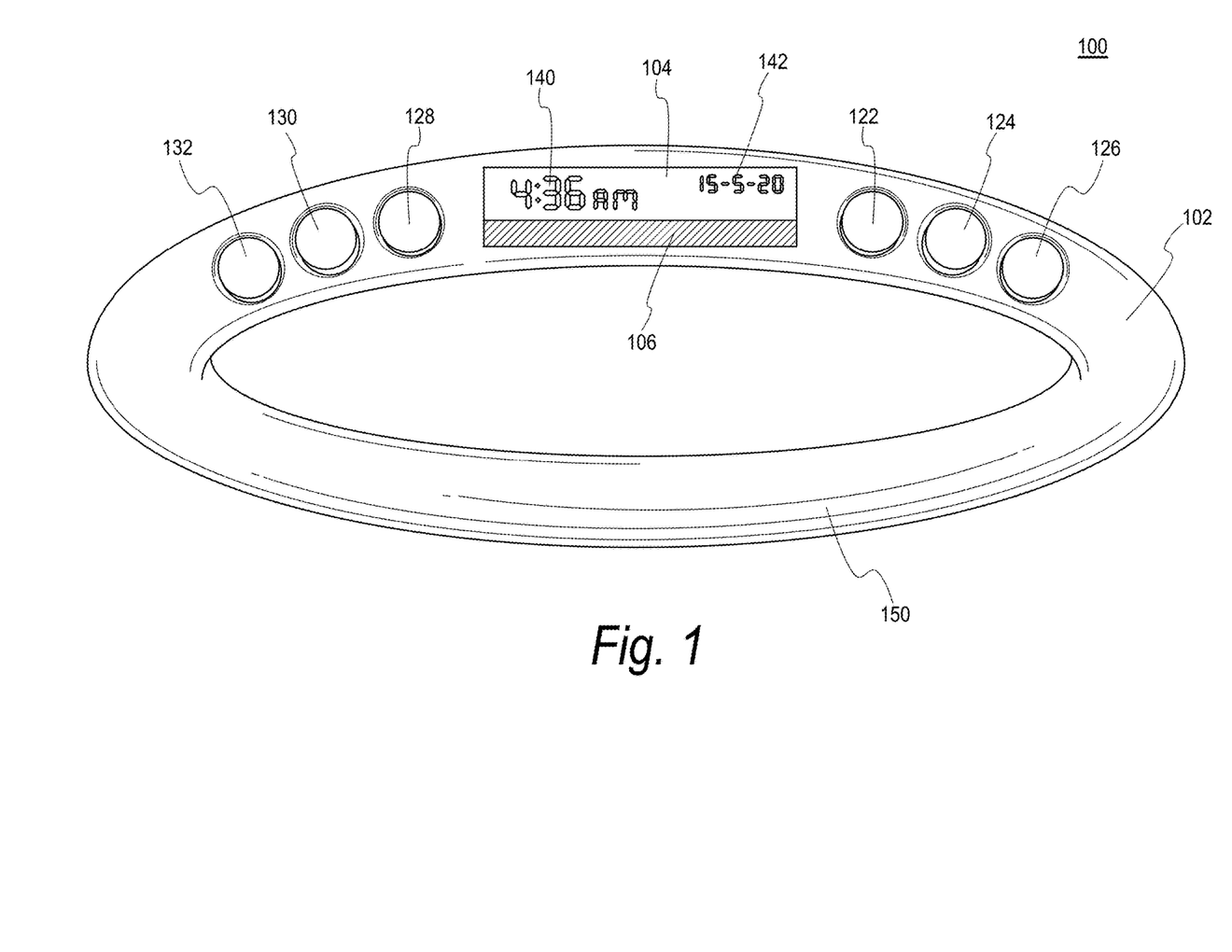
FIG. 1 is a front perspective view of a bracelet key fob with a clock in accordance with the teachings of this disclosure.

Turning to the Figures and to FIG. 1 in particular, a front perspective view of a bracelet car key fob with a clock is shown and generally indicated at 100. The bracelet 100 includes a body 102, a clock 104, a solar panel 106, a set of buttons 122, 124, 126, 128, 130 and 132 for operating the bracelet 100. The buttons 122-132 are placed next to each other along the perimeter of the bracelet 100. The linear orientation of the buttons 122-132 provides numerous benefits, such as ease of operation. The body 102 includes a portion that houses the clock 104, the solar panel 106 and the buttons 122-132, and the other portion 150 for attaching the bracelet to a user. In one implementation, the housing portion is disposed between the buttons 122-132. In other words, the housing is substantially linear with the buttons 122-132 along the perimeter of the bracelet 100. The clock 104 and the solar panel 106 are collectively referred to herein as a timing device. Accordingly, the buttons 122-132 and the timing device are in a single substantially linear arrangement with the buttons 122-132 along the circular perimeter of the bracelet 100. In other words, the buttons 122-132 and the timing device are linear along the circular perimeter of the bracelet 100.

Figure 2:
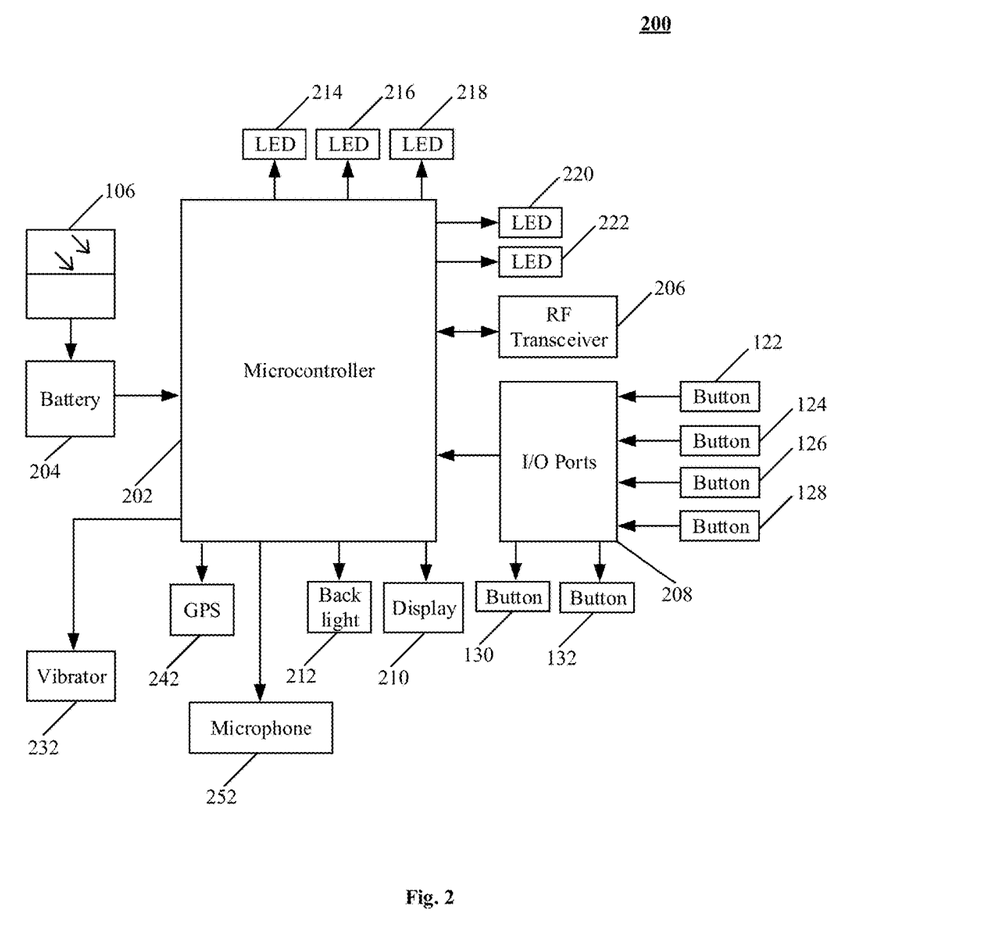
FIG. 2 is a simplified block diagram of a bracelet key fob in accordance with the teachings of this disclosure.

A block diagram of a control system of the bracelet 100 shown in FIG. 2 and generally indicated at 200. The bracelet 100 includes microcontroller 202, a RF transceiver 206 for communicating with a vehicle over a radio frequency link, a set of input/output ("I/O") ports 208 for operatively coupling the buttons 122-132 to the microcontroller 202, a display 210 for displaying time and/or other types of information, a back light 212, the solar panel 106, and a set of Light Emitting Devices ("LEDs") 214, 216, 218, 220 and 222. In addition, the bracelet 100 includes a battery 204 providing power to the microcontroller 202, the LEDs 214-222, the RF transceiver 206, the back light 212 and the display 210. In one implementation, the battery 204 is a rechargeable battery that is operatively coupled to the solar panel 106. The solar panel 106 receives light and converts light into electricity stored in the battery 204. In an alternate embodiment, the solar panel 106 is not included. Instead, the battery 204 is, for example, a coin battery that is not rechargeable.

Computer programs (such as firmware and/or application layer software) are executed by the microcontroller 202 to implement various functions of the bracelet 100. For example, a computer program running on the microcontroller 202 controls the operation of the clock 104. As an additional example, another computer program running on the microcontroller 202 send data to and receive data from the vehicle (not shown) over the RF transceiver 206. The data includes, for example, a command to unlock or lock the front door on the driver side of the vehicle.

Figure 5:
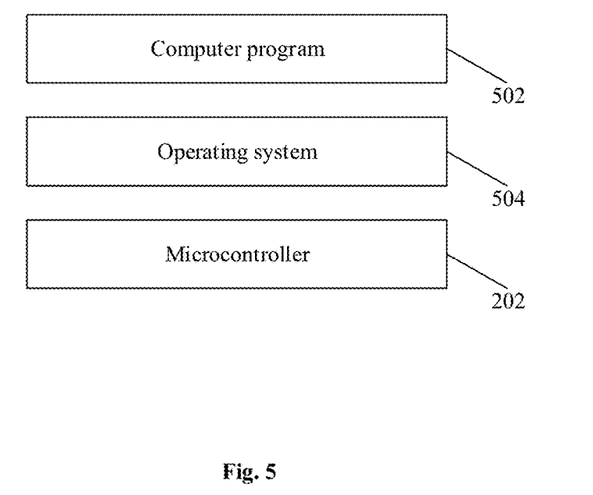
FIG. 5 is a simplified block diagram of a control system within a bracelet key fob in accordance with the teachings of this disclosure.

The computer programs are further illustrated by reference to FIG. 5. A computer program 502 runs on the microcontroller 202. In one implementation, an operating system layer 504 is disposed between the computer program 502 layer and the microcontroller 202. The operating system 504 assists in managing the resources of the microcontroller 202 and other components of the control system 200 provided by the microcontroller 202, and provides access interfaces to software applications, such as the computer program 502.

Turning back to FIG. 2, when the button 122 is pressed by the user, the microcontroller 202 detects that the button 122 has been pressed. Then, the microcontroller 202 sends an auto-start command to the vehicle via the RF transceiver 206. The auto-start message instructs the vehicle's engine controller to start the engine. To provide feedback to the user when the button 122 is pressed, the LED 214 is turned on in green color. The LED 214 is turned off when the button 122 is released. The microcontroller 202 controls the operation of the LED 214 and other LEDs.

The LED 214 is disposed beneath the button 122. Similarly, the LEDs 216-222 are disposed beneath the buttons 124-126,130-132 respectively. Furthermore, the LEDs 214-222, the RF transceiver 206, the I/O ports 208, the back light 212, the microcontroller 202 and the battery 204 are disposed within a cavity of the body 102.

When the button 124 is pressed, the microcontroller 202 is notified of the state change of the button 124. The microcontroller 202 then turns on the LED 216 in red color, and sends a command using the RF transceiver 206 to the vehicle to lock the doors of the vehicle. When the button 124 is released, the LED 216 is then turned off.

When the button 126 is pressed, the microcontroller 202 is notified of the state change of the button 126. The microcontroller 202 then turns on the LED 218 in green color, and sends a command using the RF transceiver 206 to the vehicle to unlock one or more doors of the vehicle. When the button 126 is released, the LED 218 is then turned off.

When the button 130 is pressed and held down for a predetermined amount of time (such as three seconds), the microcontroller 202 then turns on the LED 220 in red color, and sends a panic command using the RF transceiver 206 to the vehicle to produce a loud and alarming sound. The alarming sound indicates that the user is panic now, and raises the attention of surrounding people, such as police officers. The predetermined amount of time prevents false alarm when the button 130 is accidently pressed. When the button 130 is released, the microcontroller 202 also sends a message to the vehicle to stop generating the alarming sound.

When the button 132 is pressed, the microcontroller 202 turns on the LED 222 in green color, and sends a command using the RF transceiver 206 to the vehicle to open the trunk of the vehicle. The LED 222 is turned off when the button 132 is released.

The electronic clock 104 displays a time 140 and a date 142 (collectively referred to herein as time) on the display 210, such as a rectangular liquid crystal display ("LCD"). When the button 128 pressed, a back light is turned on to make the time display more visible. In such a case, the display 210 and the clock 104 are each said to have been lightened up. When the button 128 is released from its pressed-down position, the back light 212 is turned off. In certain situations, it is desirable to turn off the clock 104. For example, turning off the clock 104 makes the bracelet 100 more aesthetically appealing. To do so, a user of the bracelet 100 presses the button 128 and holds it down for a predetermined amount of time (such as three seconds). The clock 104 is then turned off. In other words, the time 140-142 is no longer displayed on the screen. When the clock 104 is off, pressing the button 128 again causes the clock 104 to be turned on. The clock 104 and its states are controlled by the microcontroller 202. The state change of the clock 104 is further illustrated by reference to FIG. 3.

Figure 3:
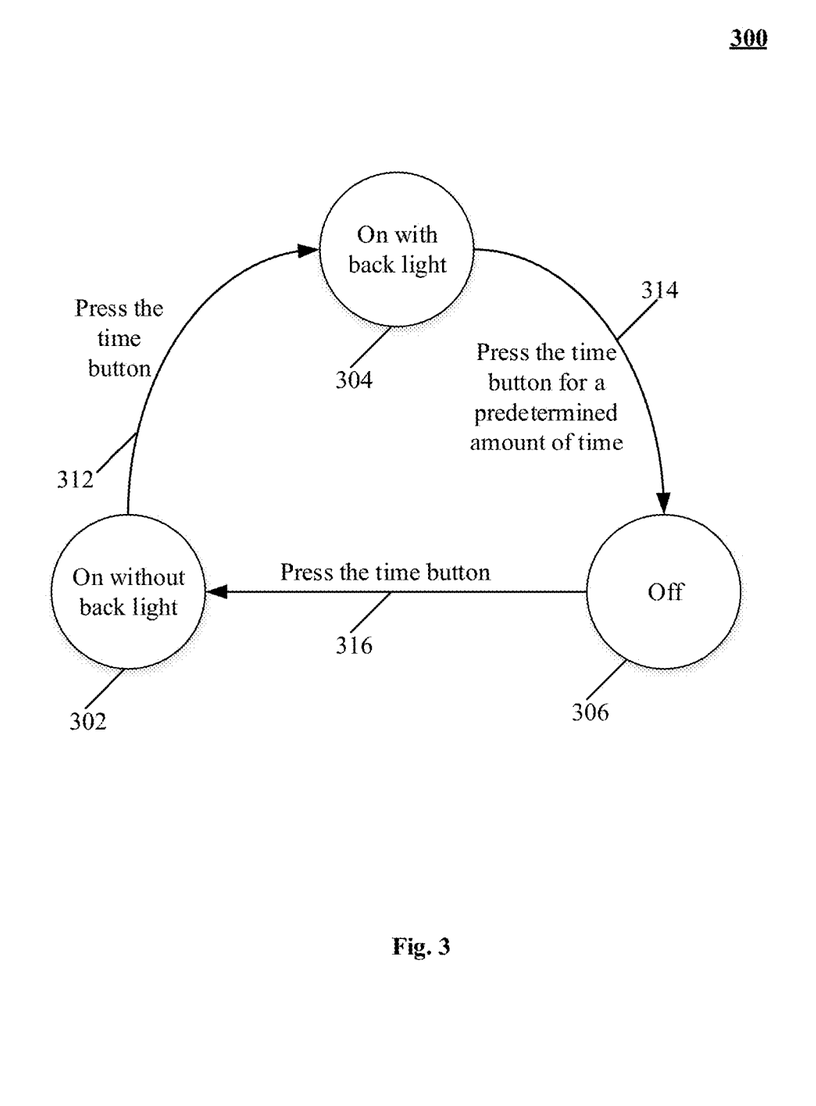
FIG. 3 is a state diagram of a clock in bracelet key fob in accordance with the teachings of this disclosure.

Referring to FIG. 3, a state diagram of the clock 104 is shown. At 302, the clock 104 is on and displays the time 140-142. However, at the state 302, the back light 212 is off. When the time button 128 is pressed as indicated at 312, the state of the clock 104 switches to the state 304. At the state 304, the clock 104 is on and displays the time 142-144. In addition, at the state 304, the back light 212 is on. When the button 128 is held down for a predetermined amount of time (such as three seconds) as indicated at 314, the clock 104 is switched to the off state 306. The clock 104 switches from the off state 306 to the state 302 when the time button 128 is pressed again.

When the bracelet 100 is put on by the user, the user guides her hand through the opening formed by the body 102. The body 102 then encircles around the wrist area of the user's arm. The strap 150 is made of, for example, elastic material (such as rubber). The elasticity of the material allows the user's hand to penetrate through the center ring of the body 102. The bigger size of the user's hand than the center opening of the body 102 prevents the bracelet 100 from falling off the user's hand.

In a different implementation, the strap 150 is not a closed band. Instead, the strap 150 includes two strap parts. The first strap part incorporates a case back, a buckle tongue and a set of free loops. The second strap part incorporates a set of adjustment holes for receiving the buckle tongue when the second strap is attached to the first strap part through the case back. In yet another different implementation, the strap 150 is made of metal material in the shape of a cuff that is not closed.

The body 102 is constructed in aesthetical designs. For example, the strap 150 is imprinted with different artistic patterns and/or colors, such as the logo of the manufacturer of the vehicle associated with the bracelet 100. As an additional example, the strap 150 is decorated with artistic ornaments. In such a case, when the body 102 is turned around such that the clock 104 faces toward the side of the body of the user, the strap 150 portion of the bracelet 100 faces away from the user. Accordingly, the bracelet 100 presents itself as a fashion item, and provides a decorative function.

Figure 4:
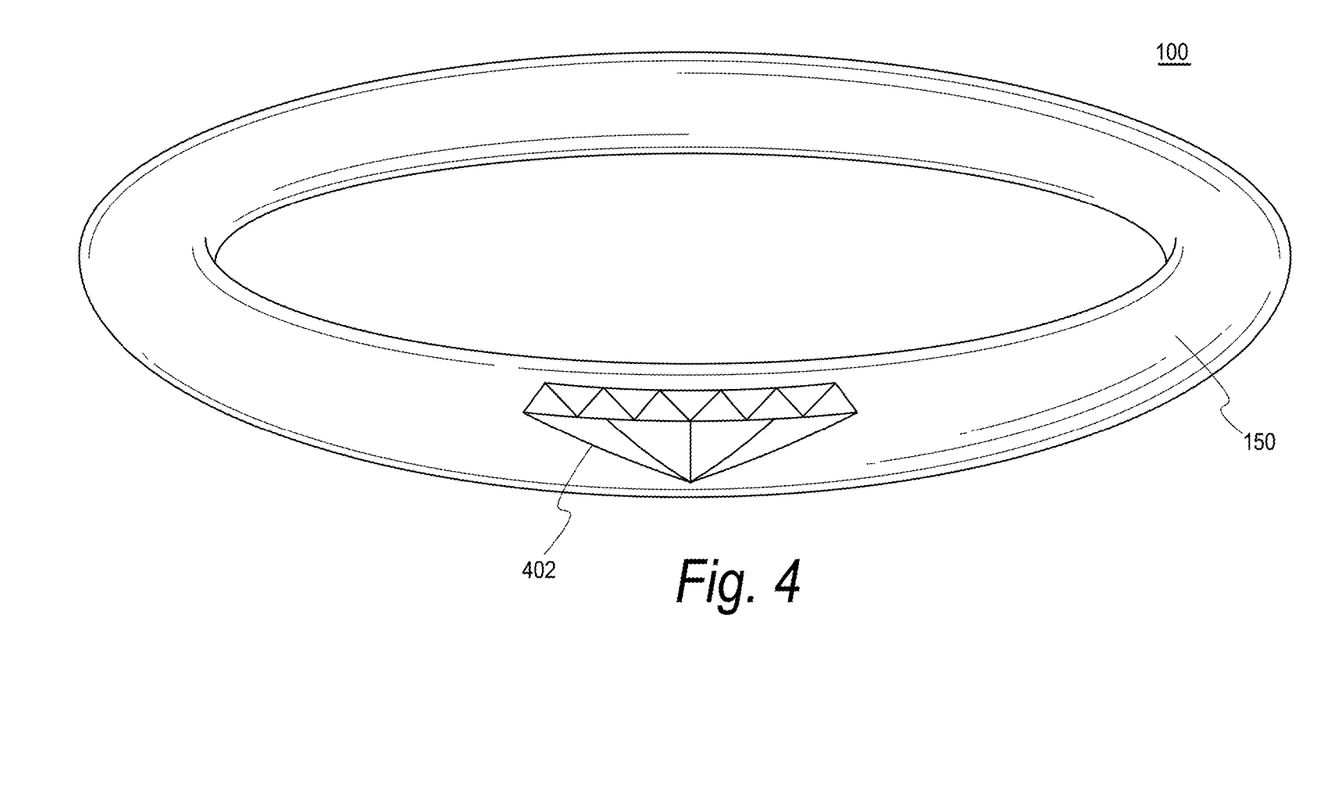
FIG. 4 is a rear perspective view of a bracelet key fob with a clock in accordance with the teachings of this disclosure.

Referring to FIG. 4, a rear perspective view of the bracelet 100 is shown. On the outside surface of the strap 150, a fashion design 402 is provided. The fashion design 402 includes a diamond. Different fashion designs can be incorporated into the bracelet 100.

The vehicle key fob 100 is worn on a wrist of the user. In other words, it is attached to the body of the user as an extremely convenient ornamental accessory. Accordingly, it prevents loss and theft. For example, the user may leave her entire key chain inside her car while she is outside the vehicle and carries the bracelet 100 on her person. In such a case, she does not have to carry the entire key chain in her pocket or bag. Not carrying the key chain around greatly reduces the possibility of loss or theft of the key chain. In addition, the artistically decorated bracelet 100 functions as a fashion item.

The bracelet 100 is more durable than other types of clocks, such as Apple Watch offered by Apple, Inc. In addition, the bracelet 100 is not connected to the Internet. Accordingly, it is immune to Internet based hacking attacks. In other words, the bracelet 100 is not exposed to cyber threats.

In addition, the bracelet 100 allows the user to access her vehicle without pressing any button on the bracelet 100. For example, when the user carrying the bracelet 100 on her person stands next to the vehicle, the bracelet 100 is within a very close proximity of the vehicle. The microcontroller 202 then communicates with a controller component (such as an engine controller or accessory controller) of the vehicle via the transceiver 206. In such a case, operating a door handle of the vehicle by the user allows the user to open the corresponding door of the vehicle. For example, the user can press a button on the door handle or pulls the door handle twice to cause the door open. Once the user is inside the vehicle with the bracelet 100, pressing a push-to-start button of the vehicle causes the vehicle to start.

In a further implementation, the bracelet 100 incorporates a vibrator 232 (in FIG. 2) triggered by system events. The vibrator 232 serves as an alarming device indicating a status or event of the bracelet 100 to the user of the bracelet 100. In one embodiment, the vibrator 232 is triggered by the microcontroller 202 when the battery 204 is below a threshold. For example, when the battery voltage of the battery 204 is below a predetermined level, the vibrator 232 is triggered to vibrate by this system event. The vibrator 232 includes, for example, a small electric motor connected to an off-center weight.

New models of automobiles have started to incorporate autopilot features, which allow such cars to self-drive. To control an autopilot enabled vehicle, the bracelet 100 incorporates a Global Positioning System ("GPS") subsystem, which is indicated at 242. The GPS component 242 receives signals from GPS satellites, and uses the signals to determine the physical location of the bracelet 100 using, for example, triangulation. The physical location of the bracelet 100 is also regarded as the physical location of the wearer of the bracelet 100, and is expressed in the form of, for example, a set of coordinates (such as latitude and longitude).

Figure 6:
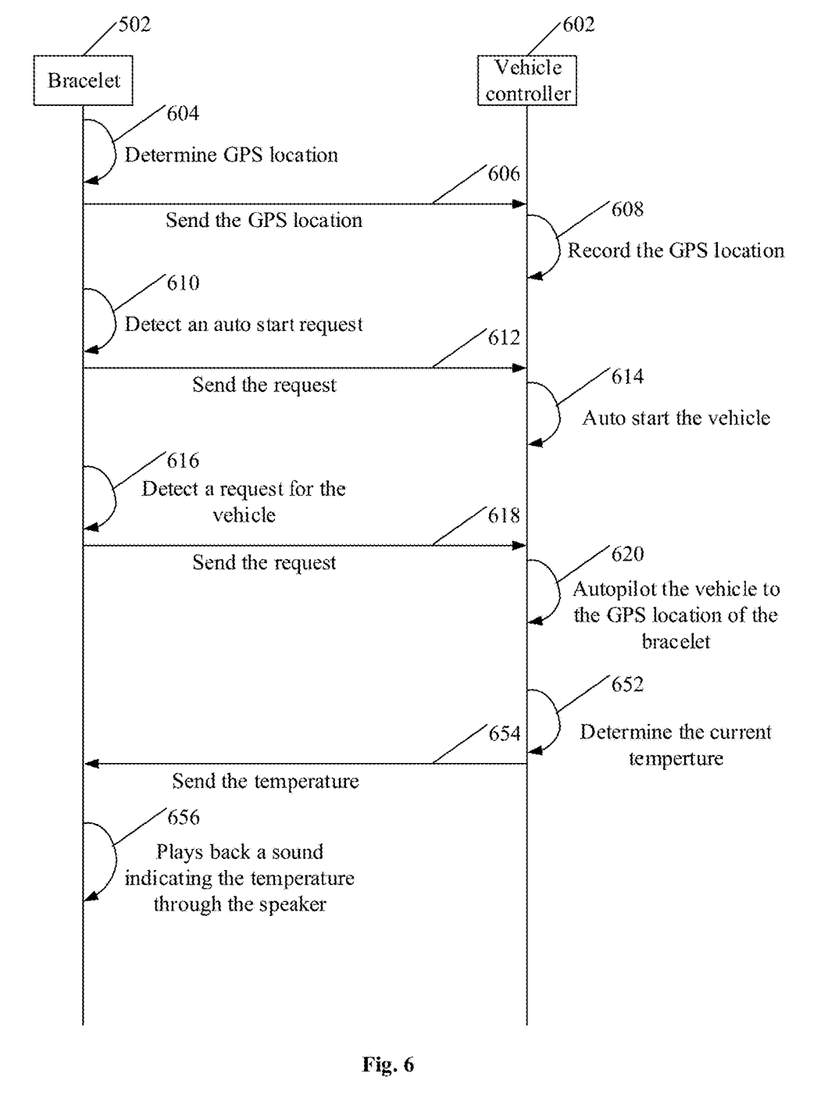
FIG. 6 is a sequence diagram illustrating the process by which a bracelet key fob controls a vehicle to drive to the physical location of the bracelet in accordance with the teachings of this disclosure.

Referring to FIG. 6, a sequence diagram illustrating the process by which the bracelet 100 controls a vehicle to drive to the physical location of the bracelet 100 is shown and generally indicated at 600. At 604, the computer program 502 determines the present physical location of the bracelet 100 by retrieving it from the GPS 242. At 606, over the RF transceiver 206, the computer program sends the GPS location to a vehicle controller 602 within the vehicle operated by the bracelet 100. At 608, the vehicle controller 602 stores the received GPS location in, for example, memory. Accordingly, the vehicle controller 602 obtains knowledge of the location of the bracelet 100 and its user.

When the user presses the auto-start button 122, at 610, the microcontroller 202 detects that the button 122 has been pressed. At 612, the bracelet 100 sends an auto-start command to the vehicle via the RF transceiver 206. At 614, the vehicle controller 602 receives the request, and starts the vehicle.

Once the vehicle has started, the user can operate the bracelet 100 to have the vehicle self-drive to the physical location of the user. For example, the button 128 is reprogrammed to direct the vehicle to autopilot. As an additional example, after the vehicle has started, pressing the button 122 and holding it down for a predetermined period (such as three seconds or more) cause the vehicle to autopilot to the physical location of the user. As still a further example, an additional button is provided to trigger the autopilot feature. To autopilot the vehicle to the location of the bracelet 100, the user presses the autopilot feature button. At 616, the microcontroller 202 detects the press of the autopilot feature button, which means a request for the vehicle to self-drive to the user's location. At 618, the computer program 502 sends the request to the vehicle controller 602. In response, at 620, the vehicle controller 602 autopilots the vehicle to the physical location of the bracelet 100. It should be noted that the autopilot feature button is not required to practice the present disclosure. As further explained below, the autopilot feature can be operated using voice input.

In a further implementation, the control system 200 further includes a voice recognition system allowing the user to operate the bracelet 100 using voice commands, such as "auto start," "panic", "open trunk" and "pick me up." These commands are interpreted as if the buttons 122, 130, 132 and the autopilot buttons have been pressed respectively. The voice input is entered using a microphone device 252 operatively coupled to the microcontroller 202. A voice recognition computer program, such as the computer program 502, retrieves the voice input and performs voice recognition. The bracelet 100 is configured to accept a name (such as "Javis") for itself. The name of the bracelet 100 can be configured during manufacturing process. Alternatively, the bracelet 100 provides a process allowing the user to enter a name of the user's choice. The voice command based operation is further illustrated by reference to FIG. 7.

Figure 7:
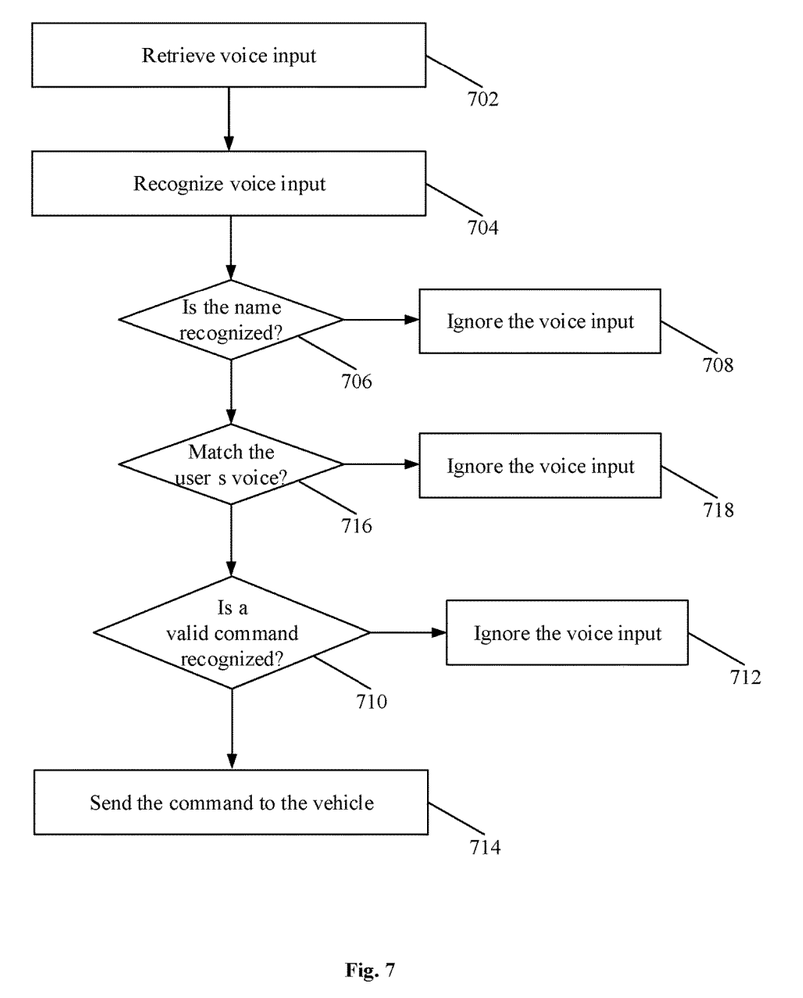
FIG. 7 is a flowchart depicting a process by which a bracelet key fob receives a voice command and operates a vehicle based on the voice command in accordance with the teachings of this disclosure.

Referring now to FIG. 7, a flowchart depicting a process by which the bracelet 100 receives a voice command and operates the vehicle based on the voice command is shown and generally indicated at 700. When the user speaks, at 702, the microphone 252 detects and retrieves the voice, and converts the voice input into digital format.

At 704, the computer program 502 performs voice recognition on the voice input data. At 706, the computer program 502 determines whether the name of the bracelet 100 is recognized. For example, whether the name "Javis" is spoken at beginning of the voice command is determined. If not, at 708, the computer program 502 ignores the voice input and discards it. Otherwise, t 716, the computer program 502 determines whether the voice input is from a particular person, such as the user of the key fob 100. In one implementation, the key fob 100 is preconfigured with the voice of the user speaking the name. In such a case, at 716, the computer program 502 compares the preconfigured voice with that recognized at 706. If no match is found, at 718, the computer program 502 ignores the voice input, and may further provides an audio or visual feedback reflecting the mismatch.

If the user is matched, at 710, the computer program 502 determines whether a valid command (such as "auto start," "pick me up" and "open truck") is recognized. If not, at 712 the computer program 502 discards the voice command input. Otherwise, at 714, the computer program 502 sends the recognized command to the vehicle controller 602. For example, when the "pick me up" command is recognized, it is sent to the vehicle controller 602 for the vehicle to autopilot to the location of the user. In response, the vehicle self-drives to the GPS location of the bracelet 100.

Figure 8:
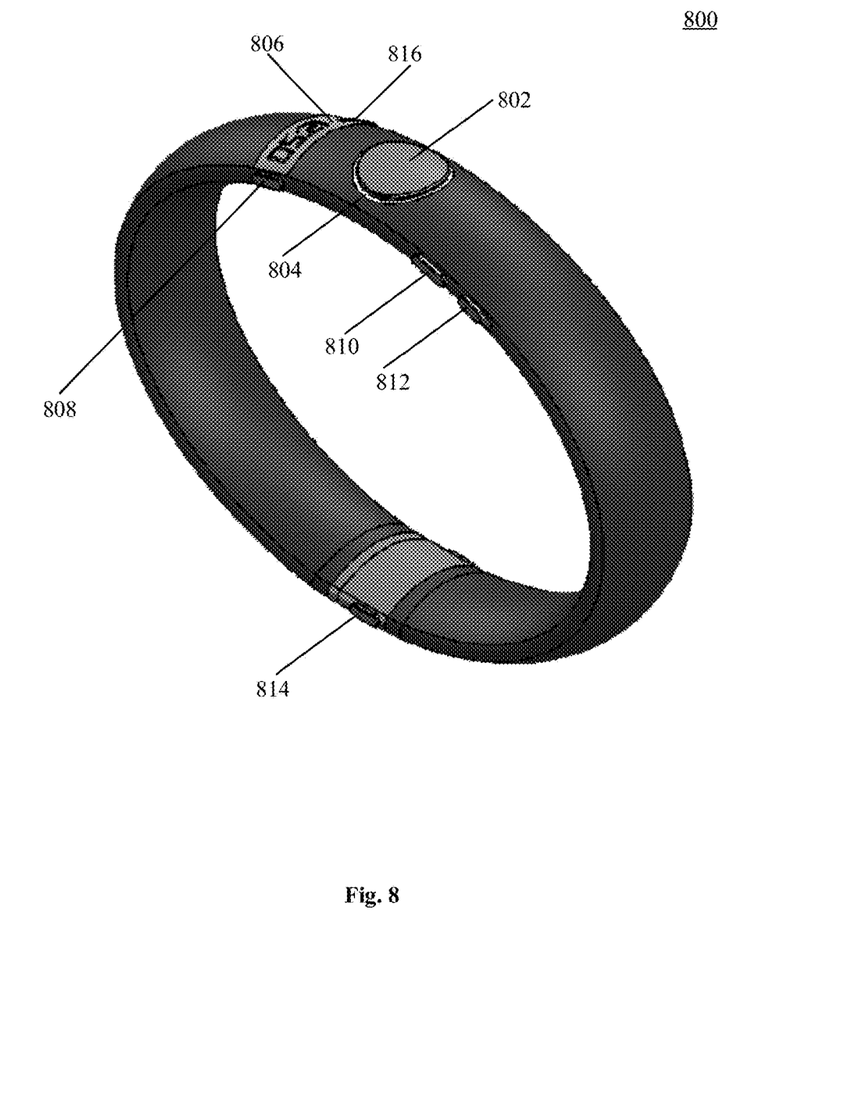
FIG. 8 is a front perspective view of a bracelet key fob with a clock in accordance with the teachings of this disclosure.
Figure 9:
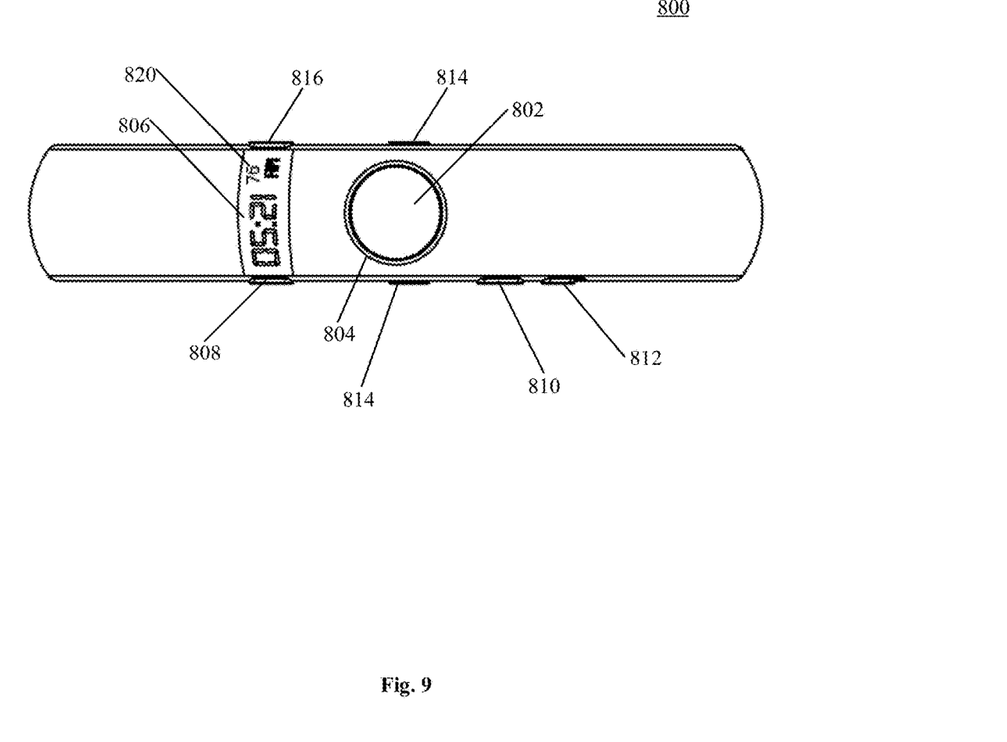
FIG. 9 is a top view of a bracelet key fob with a clock in accordance with the teachings of this disclosure.

In a further implementation, the key fob 100 incorporates a speaker 262 that is operatively coupled to the microcontroller 202. Sound indicating a current temperature is played out through the speaker 262. The temperature reporting process is further shown by reference to FIG. 6. At 652, the vehicle controller 602 determines the current temperature using, for example, a thermometer. At 654, the vehicle controller 602 sends the temperature to the key fob 100, which receives the temperature over the RF transceiver 206. At 656, the key fob 656 plays back a sound indicating the temperature through the speaker 262. The sound can be composed from sound elements. For example, "75 degrees" can be composed from sound elements indicating "seventy," "five" and "degrees." It should be noted that element 656 is optional, and is performed only if a speaker available. When there is not a speaker available, the The key fob 100 can be implemented in different physical forms. An alternate embodiment is shown and illustrated by reference to FIGS. 8 and 9. FIG. 8 is a front perspective view of a key fob 800, a top view of which is shown in FIG. 9. The schematic components of the key fob 800 can be those included and shown in FIG. 2.

The key fob 800 includes a time display screen 806 (such as the display 210), two clock time buttons 808 and 816 (such as the buttons 126-128), a lock button 802 (such as the button 122), a LED 804 (such as the LEG 220) beneath the lock button 802, a trunk button 810 (such as the button 132), a panic button 812 (such as the button 130), and a pair of latches 814. It should be noted that the panic button 812 is also referred to herein as a panic switch. The button 802 is a multi-functional button. The LED 804 lights up around the button 802. When the button 802 is pressed once, it causes a message sent to the vehicle controller 602 to lock the vehicle. In such a case, the LED 804 is turned on in red color for a predetermined amount of time, such as two seconds. If the button 802 is pressed twice within a predetermined amount of time, such as one and half seconds, it causes a different message sent to the vehicle controller 602 to unlock the vehicle. In such a case, the LED 804 is turned on in green color for a predetermined amount of time, such as two seconds. If the user walks away from the vehicle with the key fob 800 while the vehicle is in an unlocked state, the LED 804 stays in green color to remind the user.

If the button 802 is pressed down and held down for a predetermined amount of time, such as three seconds, the LED 804 then flashes in green color; and a message is sent to the vehicle controller 602 to auto-start the vehicle. If the vehicle has been auto-started for a predetermined amount of time, such as three minutes, before it is operated for driving, the vibrator 232 is triggered and the LED 804 flashes in green to remind the user that the vehicle has been auto-started without being operated by the user.

The display 806 displays the current time and temperature 820 received from the vehicle controller 602. The display 806 may also contain the solar panel 106. When the button 816 is pressed and held down for a predetermined amount of time, such as two seconds, the hour number of the current time starts blinking. In such a case, releasing the button 816 and pressing it again will cause the hour number changed to a desired hour number. Similarly, the button 808 can be operated to set the correct minute of the current time. When both the buttons 808 and 816 are pressed at the same time or roughly the same time, the screen 806 is lightened up to show the current time more clearly. For example, in a dark setting, this feature allows the user to easily see the current time. If both the buttons 808 and 816 are pressed and held down at the same time for a predetermined amount of time, such as four seconds, the screen 806 is turned off to save battery power. When the battery level is low, the screen 806 is automatically turned off.

When the button 810 is pressed and held down for a predetermined amount of time, such as three seconds, a message is then sent from the key fob 800 to the vehicle controller 602 for open the trunk of the vehicle. When the trunk is open for a predetermined amount of time, such as fifteen minutes, the vehicle controller 602 then sends a message to the key fob 800. In such a case, the vibrator 232 is triggered to remind the user the trunk has been open for too long.

When the panic button 812 is pressed, a message is then sent from the key fob 800 to the vehicle controller 602 for activating the vehicle alarm. In such a case, the vibrator 232 can be optionally triggered. The two latch buttons 814 allow the bracelet 800 to securely wrap around the wrist of the user. When the buttons 814 a pressed, the bracelet 800 can be unlocked and taken off of the wrist.

Obviously, many additional modifications and variations of the present disclosure are possible in light of the above teachings. Thus, it is to be understood that, within the scope of the appended claims, the disclosure may be practiced otherwise than is specifically described above without departing from the true spirit and scope of the present invention. For example, the time 140-142 is displayed in different format or language. As an additional example, buttons of this disclosures can be implemented as switches with binary states. As still a further example, whenever the key fob 100 or 800 has an error condition, the vibrator 232 is turned on and a LED (such as the LED 804) is turned into red color. As a further example, an error system processes certain error conditions, such as, when the vehicle is set for auto-pilot and fails to moves to the user's location due to, for instance, an incident, out of radius, loss of GPS location, etc.

The foregoing description of the disclosure has been presented for purposes of illustration and description, and is not intended to be exhaustive or to limit the disclosure to the precise form disclosed. The description was selected to best explain the principles of the present teachings and practical application of these principles to enable others skilled in the art to best utilize the disclosure in various embodiments and various modifications as are suited to the particular use contemplated. It should be recognized that the words "a" or "an" are intended to include both the singular and the plural. Conversely, any reference to plural elements shall, where appropriate, include the singular.

It is intended that the scope of the disclosure not be limited by the specification, but be defined by the claims set forth below. In addition, although narrow claims may be presented below, it should be recognized that the scope of this invention is much broader than presented by the claim(s). It is intended that broader claims will be submitted in one or more applications that claim the benefit of priority from this application. Insofar as the description above and the accompanying drawings disclose additional subject matter that is not within the scope of the claim or claims below, the additional inventions are not dedicated to the public and the right to file one or more applications to claim such additional inventions is reserved.

What is claimed is:

1. A bracelet comprising:
   i. a body adapted to wrap around a wrist of a user;
   ii. a microcontroller disposed within said body;
   iii. a transceiver disposed within said body for communicating with a vehicle and operatively coupled to said microcontroller;
   iv. a set of buttons disposed within said body for controlling access to said vehicle, wherein said set of buttons includes an auto-start button, a lock door button, an unlock door button and an open trunk button, wherein each button within said set of buttons is operatively coupled to said microcontroller, and wherein pressing each button within said set of button causes a corresponding vehicle operation command sent to said vehicle over said transceiver;
   v. a clock disposed within said body and operatively coupled to said microcontroller for providing a time;
   vi. a timing device including a display, said timing device disposed within said body and operatively coupled to said microcontroller for displaying said time, and wherein said timing device and said set of buttons are in a single linear arrangement along a circular perimeter of said body; and
   vii. a computer program running on said microcontroller, wherein said computer program is adapted to send commands corresponding to said set of buttons to said vehicle over said transceiver.

2. The bracelet of claim 1 further comprising a set of colored LEDs corresponding to said set of buttons, wherein said set of LEDs is disposed within said body and operatively operated to said microcontroller, and wherein a LED within said set of LEDs is turned on when the corresponding button within said set of buttons is pressed.

3. The bracelet of claim 1 further comprising a Global Positioning System ("GPS") subsystem providing physical location of said bracelet, and an autopilot button disposed within said body and operatively coupled to said microcontroller, wherein:
   i) said computer program sends said physical location to said vehicle; and
   ii) pressing of said autopilot button causes said computer program to send an autopilot command to said vehicle, wherein said vehicle self-drives to said physical location in response to said autopilot command.

4. The bracelet of claim 3, wherein said set of buttons includes said autopilot button.

5. The bracelet of claim 3 further comprising a microphone device disposed within said body and operatively coupled to said microcontroller, wherein said computer program:
   i) retrieves voice input data captured by said microphone;
   ii) performs voice recognition on said voice input data;
   iii) determines that a name of said bracelet is recognized from said voice input data;
   iv) determines that a vehicle operation command is recognized from said voice input data; and
   v) sends said vehicle operation command to said vehicle over said transceiver.

6. The bracelet of claim 5, wherein said set of buttons includes said autopilot button.

7. The bracelet of claim 1 further comprising:
   i) a back light disposed within said body and operatively coupled to said microcontroller; and
   ii) a backlight button disposed within said body and operatively coupled to said microcontroller, wherein pressing said backlight button causes said back light turned on to make said display lightened up.

8. The bracelet of claim 1 further comprising a vibrator disposed within said body and operatively coupled to said microcontroller, wherein said vibrator is triggered by a system event.

9. The bracelet of claim 1, wherein said transceiver is a radio frequency transceiver.

10. The bracelet of claim 1, wherein said body is made of elastic material.

* * * * *